United States Patent [19]

Benzinger

[11] 4,278,733

[45] Jul. 14, 1981

[54] EPOXY MODIFIED ANILINE-PHENOLIC LAMINATE

[75] Inventor: James R. Benzinger, Orchard Park, N.Y.

[73] Assignee: Spaulding Fibre Company, Inc., Buffalo, N.Y.

[21] Appl. No.: 59,581

[22] Filed: Jul. 23, 1979

[51] Int. Cl.³ .................. B32B 27/08; B32B 27/10; B32B 27/26; B32B 27/38; B32B 27/42
[52] U.S. Cl. ................... 428/413; 156/330; 156/307.4; 156/331.3; 260/29.3; 428/477.4; 428/480; 428/531; 525/490
[58] Field of Search .............. 525/490; 260/29.3; 156/330, 331; 428/355, 531, 413, 477.4, 480

[56] References Cited

U.S. PATENT DOCUMENTS

| | | | |
|---|---|---|---|
| 2,511,913 | 8/1950 | Greenlee . | |
| 3,616,046 | 6/1968 | Benzinger et al. | 156/331 |
| 3,706,619 | 12/1972 | Freeman | 156/330 |
| 3,719,724 | 3/1973 | Freeman | 156/330 |
| 3,784,496 | 1/1974 | Smith | 156/330 |
| 3,922,468 | 11/1975 | Burke et al. | 156/330 |
| 3,972,765 | 8/1976 | Kondo et al. | 156/330 |
| 4,001,155 | 1/1977 | Kempter | 525/490 |

*Primary Examiner*—James C. Cannon
*Attorney, Agent, or Firm*—William A. Kemmel, Jr

[57] ABSTRACT

A laminate product and method of making the same involving a base material such as cellulose fibrous materials impregnated with a cured mixture of aniline, phenol, formaldehyde and epoxy resin, which laminate has electrical and mechanical properties with improved heat resistance over previous materials.

10 Claims, No Drawings

EPOXY MODIFIED ANILINE-PHENOLIC LAMINATE

BACKGROUND OF THE INVENTION

This invention relates to a laminate product and method of making the same which is particularly useful as an insulating material for transformers.

In U.S. Pat. No. 3,616,046 issued Oct. 26, 1971 to the present inventor and another person entitled "Method of Laminating With Aniline-Phenolic Resole", a laminate product and a method of making the same was described which possessed good physical and electrical properties and was particularly useful as a transformer insulating material. Such product was marketed by the Spaulding Fibre Company, Inc. as SPAULDITE® X-981 Laminate and such laminate enjoyed substantial commercial success. However, over the subsequent years even better electrical and physical properties were desired by the manufacturers of transformers to improve the transformer performance and from time to time certain problems were encountered with the X-981 laminate. For example, the X-981 laminate currently only meets the minimum limits for dielectric strength so that it is frequently susceptible to dielectric failures. Another example is the requirement that a transformer laminate withstand vapor phasing in a transformer without blistering. The vapor phase involves kerosene at up to 118 deg. C. and a vacuum of 1 millimeter of mercury over several days cycling to remove moisture from the insulation in the transformer. At the end of the dry portion of the cycle, the tank is flooded with transformer oil to impregnate the unit. Thus, while the X-981 laminate usually was capable of going through vapor phases without blistering, from time to time it was unable to do so. In connection with the aforementioned blistering problem there is a physical property of the laminate identified as glass transition temperature and it is thought that a higher glass transition temperature should be able to resolve the problem of blistering.

In response to such need for improved electrical and physical properties and the problems noted above, an object of the present invention is a laminate which has been identified as SPAULDITE X-982 which has improved physical and electrical properties at elevated temperatures particularly in the environment of an oil-filled transformer.

Another object of the present invention is a laminate which does not blister when subjected to repeated vapor phase cycling as encountered in transformer start-up.

Still another object of the present invention is a laminate which has an increased glass transition temperature.

SUMMARY OF THE INVENTION

In general, the present invention involves a laminate and method of making the same comprising a base material such as cellulosic fibrous materials impregnated with a cured mixture of a first composition comprising two moles of aniline, about 5 to 28 moles of phenol and about 7 to 30 moles of formaldehyde and a second composition comprising epoxy resin such as an epoxy phenolic novalac resin which is about 10% to 500% by weight of the first composition.

In order to facilitate understanding the present invention, reference will now be made to a preferred specific embodiment of the present invention and specific examples thereof. Such examples, like the preceding summary, should not be construed as limiting the present invention which is properly set forth in the appended claims.

DESCRIPTION OF THE PREFERRED EMBODIMENT OF THE PRESENT INVENTION

The resin of the present invention may be obtained by reacting aniline, phenol and formaldehyde which reaction may proceed with or without the presence of a basic catalyst although the use of a catalyst is preferred. If loss of efficiency is not a factor, the catalyst may be dispensed with as noted above. More particularly, the resin may be prepared by reacting two moles of aniline, about 5 to 28 moles of phenol, and about 7 to 30 moles of formaldehyde in the presence of basic catalysts such as ammonia, triethanolamine, sodium hydroxide, boron trifluoride, monoethanolamine, and barium hydrates. The preferred molar ratio of aniline, phenol and formaldehyde is two moles of aniline, about 7 moles of phenol and about 10.5 moles of formaldehyde. After reaction, solvent such as isopropyl alcohol, acetone, methyl ethyl ketone, methyl alcohol or the like is added in an amount sufficient to bring the total solids content to about 50% for impregnation purposes. If the material to be impregnated is cellulosic fibrous material, the water content is adjusted to between about 5% and 12% by weight. If such mixture is used to impregnate synthetic fibrous materials, the water content may be adjusted to below about 5% by weight. To the above described resin mixture is then added an epoxy resin in the amount of about 10% to 500% by weight of such initial resin mixture. Preferred ratio of the epoxy resin is about 25% to 50% by weight of the first resin mixture. A preferred resin composition and laminate and method of making the same is as follows:

EXAMPLE 1

Twenty parts by weight of aniline, 70 parts by weight of phenol and 90 parts by weight of 37% formalin together with 3 parts by weight of aqueous ammonia, 26° Baumé, were reacted in a resin kettle by refluxing at 212° F. with stirring. After about one hour of refluxing, heating and agitation were terminated and the resinous mixture was separated from the aqueous layer. To the resinous mixture was added methyl ethyl ketone and methyl alcohol in an amount sufficient to bring the total solids content to about 50% by weight. For impregnation of cellulous fibre materials, the water content is adjusted between about 5% and 12% by weight. To 3 parts by weight of the initial resin mixture is then added to 1 part by weight of an epoxy phenolic novalac resin such as Ciba EPN 1138 or Dow D.E.N. 438 with an epoxy equivalent weight of 176 to 181.

Such resin composition was used to saturate a 0.013 inch kraft saturating paper to a resin content of approximately 43% by weight. The impregnated paper was cured to "B" stage by oven heating at a temperature of 320 F. for 2½ minutes to a flow of 12%. A laminate was formed by plying up the "B" stage sheets and curing to "C" stage by subjecting them to a pressure of 1500 psi at 330 degrees F. for approximately one hour. The resulting X-982 laminate had the following properties as compared to the preceding X-981 laminate:

| LAMINATE FROM EPOXY MODIFIED ANILINE-PHENOLIC RESOLE | | | |
|---|---|---|---|
| | | X-981 | X-982 |
| Flexural MOR, psi | | | |
| As received @ R.T. | MD | | 25,730 |
| As received @ 90 deg.C. | MD | 19,560 | 17,290 |
| | CMD | 16,224 | 15,130 |
| 1VP, @ 90 deg.C. | MD | 18,430 | 19,330 |
| | CMD | 15,190 | 14,810 |
| 2VP, @ 90 deg.C. | MD | 18,170 | 18,780 |
| | CMD | 16,010 | |
| 2VP, @ 125 deg.C. | MD | 12,790 | 16,410 |
| | CMD | 9,890 | |
| Flexural MOE, psi × $10^6$ | | | |
| As received @ R.T. | MD | | 2.31 |
| As received @ 90 deg.C. | MD | 2.14 | 1.85 |
| | CMD | 1.66 | 1.37 |
| 1VP, @ 90 deg.C. | MD | 2.12 | 1.98 |
| | CMD | 1.60 | 1.44 |
| 2VP, @ 90 deg.C. | MD | 2.22 | 1.90 |
| | CMD | 1.71 | |
| 2VP, @ 125 deg.C. | MD | 1.33 | 1.68 |
| | CMD | 1.04 | |
| Horizontal Shear Strength 1", psi | | | |
| As received | MD | | 6,210 |
| As received @ 90 deg.C. | MD | | 3,680 |
| | CMD | | 3,690 |
| 1VP, @ 90 deg.C. | MD | 2,610 | 3,820 |
| | CMD | 3,020 | 3,560 |
| Compressive Strength, psi | | | |
| Perpendicular as received @ R.T. | | | 46,030 |
| as received @ 90 deg.C. | | | 34,730 |
| 1VP @ 90 deg.C. | | 38,510 | 37,200 |
| Parallel as received @ R.T. | | | 32,480 |
| as received @ 90 deg.C. | | | 23,140 |
| 1VP, @ 90 deg.C. | | 26,650 | 25,840 |
| 60 $H_z$ Dissipation Factor, % | | | |
| Perpendicular - 25 Deg.C. | | 0.86 | 0.95 |
| 90 Deg.C. | | 10.4 | 7.95 |
| 125 Deg.C. | | 67.9 | 31.0 |
| 60 $H_z$ Dielectric Constant | | | |
| Perpendicular - 25 Deg.C. | | 4.92 | 4.92 |
| 90 Deg.C. | | 5.91 | 5.64 |
| 125 Deg.C. | | 9.26 | 7.12 |
| Direct Current Volume Resistivity (× $10^{12}$ ohm-cm) | | | |
| Perpendicular - 25 Deg.C. | | 836 | 762 |
| 90 Deg.C. | | 1.17 | 2.48 |
| 125 Deg.C. | | .0159 | .127 |
| Dielectric Strength Parallel 60$H_z$ step by step at 90 Deg.C. (volts per mil) | | 136 | 181 |
| Glass Transition Temperature, Deg.C. | | 72–103 | 122–128 |

Steam, gas and infrared are some of the best heat sources which can be used to form the "B" stage. Temperature in the range of 300 to 350 degrees for one to 10 minutes have usually been used to produce the "B" stage. However, other temperature time cycles can be used.

The third and final stage, the "C" stage is produced by cutting the "B" stage product into sheets, sandwiching a pile of such sheets between press plates and laminating in a press under heat and pressure. Temperatures of 280 to 425 degrees F. and pressures of 50 to 3000 psi have been used to produce good laminates. Conventionally, however, high pressure in the thermosetting laminating industry is considered to be above about 1000 psi; however, this invention is not limited to high pressure laminates in that good laminates have been made at lower pressures.

While 0.013 inch kraft paper was used as the base material in the above described example because of its strength and low cost, other thicknesses could be employed as well. Similarly, other base materials like cotton linter paper for better electrical properties or synthetic fibres like polyester or nylon for chemical resistance and mechanical toughness could be used.

Similarly, while the preferred epoxy phenolic novalac was used in the above described example in the ratio of 1 part to 3 parts by weight of the aniline-phenol-formaldehyde resin, other ratios may be used from 1 part epoxy to 10 parts of the resin mix to 5 parts of the epoxy resin to 1 part of the resin mix. Also other epoxy resins which may be used are the cresolnovalacs, multi-functional epoxies, hydantoin epoxy resins and bisphenol A type epoxy resins, and cycloaliphatic epoxy resins.

There are many features in the present invention which clearly show the significant advance which the present invention achieves over the prior art, particularly the prior laminate X-981. Consequently, only a few of the more outstanding features will be pointed out to illustrate the unexpected and unusual results obtained by the present invention. One feature is that the laminate of the present invention has substantially improved electrical properties at elevated temperatures such as 60 Hz dissipation factor, dielectric strength, dielectric constant and direct current volume resistivity. Another feature of the present invention is that the laminate of the present invention can withstand at least three vapor phase treatments without blistering or delamination. Still another feature of the present invention is that it has a significantly higher glass transition temperature and as a result has better mechanical strength and integrity at elevated temperatures.

It will be understood that the foregoing description is only illustrative of the present invention and is not intended that the invention be limited thereto. All substitutions, alterations and modifications of the present invention which come within the scope of the following claims to which the present invention is readily susceptible without departing from the spirit and scope of this disclosure are considered part of the present invention.

What is claimed is:

1. A laminate product comprising a base material impregnated with a cured mixture of a first composition comprising two moles of aniline, about 5 to 28 moles of phenol and about 7 to 30 moles of formaldehyde and a second composition consisting essentially of an epoxy resin which is about 10% to 500% by weight of the first composition.

2. A laminate product as stated in claim 1 wherein the base material is a cellulosic fibrous material.

3. A laminate product as stated in claim 1 wherein the first composition comprises two moles of aniline, about 7 moles of phenol, and about 10.5 moles of formaldehyde.

4. A laminate product as stated in claim 1 wherein the second composition comprises an epoxy phenolic novalac resin with an epoxy equivalent weight of about 176 to 181.

5. A laminate product as stated in claim 1 wherein the second composition is about 25% to 50% by weight of the first composition.

6. A method of making a laminate product comprising:
   (a) Reacting a mixture comprising two moles of aniline, about 5 to 28 moles of phenol and about 7 to 30 moles of formaldehyde under reflux to produce a resole;
   (b) Separating said resole and adjusting the water content thereof to less than about 12% by weight;

(c) Adding a solvent to said resole in an amount sufficient to bring the total solids content to about 50% by weight;

(d) Adding essentially only epoxy resin to said mixture; and (e) Impregnating a base material with the composition from step (d).

7. A method as stated in claim 6 wherein the base material is a cellulosic fibrous material.

8. A method as stated in claim 6 wherein the initial mixture comprises two moles of aniline, about 7 moles of phenol and about 10.5 moles of formaldehyde.

9. A method as stated in claim 6 wherein the epoxy resin is an epoxy phenolic novalac resin with an epoxy equivalent weight of about 176 to 181.

10. A method as stated in claim 6 wherein the epoxy resin is added in a weight of about 25% to 50% by weight of the initial mixture.

* * * * *